US012681227B2

(12) United States Patent  
Oki et al.

(10) Patent No.: US 12,681,227 B2  
(45) Date of Patent: Jul. 14, 2026

(54) LIGHT GUIDE PLATE AND ITS MANUFACTURING METHOD

(71) Applicant: STANLEY ELECTRIC CO., LTD., Tokyo (JP)

(72) Inventors: Yoji Oki, Tokyo-to (JP); Takashi Miyamoto, Tokyo-to (JP); Lingwei Goh, Tokyo-to (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 19/118,959

(22) PCT Filed: Oct. 18, 2023

(86) PCT No.: PCT/JP2023/037662  
§ 371 (c)(1),  
(2) Date: Apr. 7, 2025

(87) PCT Pub. No.: WO2024/090301  
PCT Pub. Date: May 2, 2024

(65) Prior Publication Data

US 2026/0126578 A1     May 7, 2026

(30) Foreign Application Priority Data

Oct. 24, 2022     (JP) ................................. 2022-169719

(51) Int. Cl.  
F21V 8/00            (2006.01)

(52) U.S. Cl.  
CPC ......... G02B 6/0036 (2013.01); G02B 6/0043 (2013.01); G02B 6/0065 (2013.01)

(58) Field of Classification Search  
CPC .. G02B 6/0036; G02B 6/0038; G02B 6/0043; G02B 6/0061; G02B 6/0065  
See application file for complete search history.

(56) References Cited

U.S. PATENT DOCUMENTS 8,029,708 B2 * 10/2011 Parker ................. G02B 6/0065  
                                                      264/2.7  
8,033,710 B2    10/2011 Omori et al.  
                        (Continued)

FOREIGN PATENT DOCUMENTS

JP        H09297220 A     11/1997  
JP        2001116927 A     4/2001  
                (Continued)

OTHER PUBLICATIONS

International Search Report (ISR) (and an English language translation thereof) dated Nov. 21, 2023, issued in International Application No. PCT/JP2023/037662.  
(Continued)

*Primary Examiner* — Matthew J. Peerce  
(74) *Attorney, Agent, or Firm* — Holtz, Holtz & Volek PC

(57)            ABSTRACT

A light guide plate has a light distribution controlling surface. A concave pseudo half-spindle type reflection dot is provided in the light distribution controlling surface. The pseudo half-spindle type reflection dot includes a first curved sloped surface provided on a side of the light incident surface, and a second curved sloped surface provided on a side of the counter light incident surface against the first curved sloped surface and coupled to the first curved sloped surface. The first curved sloped surface forms a first circular arc shape viewed from the light distribution controlling surface. The second curved sloped surface forms a second circular arc shape viewed from the light distribution controlling surface. The first curved sloped surface forms a third circular arc shape viewed from the light incident surface. And the second curved sloped surface forms the third circular arc shape viewed from the counter light incident surface.

16 Claims, 16 Drawing Sheets

(56)             References Cited

U.S. PATENT DOCUMENTS

| | | | | |
|---|---|---|---|---|
| 8,388,207 B2 * | 3/2013 | Kurihara | .............. | G02B 6/0016 |
| | | | | 362/626 |
| 2005/0024849 A1 | 2/2005 | Parker et al. | | |
| 2005/0231981 A1 | 10/2005 | Hoelen et al. | | |

FOREIGN PATENT DOCUMENTS

| | | | | |
|---|---|---|---|---|
| JP | 2002214447 | A | | 7/2002 |
| JP | 2004249369 | A | | 9/2004 |
| JP | 2005519431 | A | | 6/2005 |
| JP | 2005209558 | A | * | 8/2005 |
| JP | 2008510180 | A | | 4/2008 |
| JP | 2009081094 | A | | 4/2009 |
| JP | 2010030336 | A | | 2/2010 |
| JP | 2010080240 | A | * | 4/2010 |
| JP | 2011051285 | A | | 3/2011 |
| JP | 2014093265 | A | * | 5/2014 |
| WO | 2005071311 | A1 | | 8/2005 |
| WO | 2006023077 | A2 | | 3/2006 |

OTHER PUBLICATIONS

Written Opinion dated Nov. 21, 2023, issued in International Application No. PCT/JP2023/037662.

Japanese Office Action (and an English language translation thereof) dated Sep. 30, 2025, issued in counterpart Japanese Application No. 2022-169719.

Japanese Office Action (and an English language translation thereof) dated February 3, 20265, issued in counterpart Japanese Application No. 2022-169719.

* cited by examiner (A)

(B)             (C)

(D)             (E)

(A)

(B)

(A)

(B)

(C)

(A)

(B)-1            (B)-2

(C)-1            (C)-2

(A)

(B)

(A)

(B)                   (C)

(D)                   (E)

(A)

(B)

(A)

(B)

(A)

(B)

(C)

LIGHT GUIDE PLATE AND ITS MANUFACTURING METHOD

TECHNICAL FIELD

The present invention relates to a light guide plate and its manufacturing method used in a liquid crystal display (LCD) apparatus or the like such as a side-edge type surface lightening apparatus with a light source on its side face.

BACKGROUND TECHNOLOGY

A side-edge type surface lightening apparatus has broadly been used as a surface lightening apparatus for an LCD apparatus in terms of its thin and light structure.

FIG. 12 is a diagram illustrating a general side-edge type surface lightening apparatus.

In FIG. 12, a side-edge type surface lightening apparatus U is constructed by a light guide plate 100 and a light source 200 formed by light emitting diode (LED) elements, to thereby lighten an LCD panel 300 or the like. The light guide plate 100, which is a planar plate made of acryl resin, polycarbonate resin or the like, is constructed by a light incident surface $S_{in}$ provided with the light source 200, a light emitting surface $S_{out}$ locating opposed to the LCD panel 300, a light distribution controlling surface $S_{cont}$ opposite to the light emitting surface $S_{out}$, and a counter light incident surface $S_{in}'$ locating opposite to the light incident surface $S_{in}$. Light R1 from the light source 200 is reflected by a reflection dot 100a provided on the light distribution controlling surface $S_{cont}$, and its reflected light R2 from the light emitting surface $S_{out}$ lightens the LCD panel 300.

FIG. 13 illustrates a side-edge type surface lightening apparatus using a first prior art light guide plate, wherein (A) is an entire cross-sectional view, and (B) is a perspective view of the triangular-type reflection dot of (A) (see: Patent Literature 1).

In (A) of FIG. 13, provided on a light distribution controlling surface $S_{out}$ of a light guide plate 101 is a triangular-type reflection dot 101a which is a triangular-type recess viewed from the side. Light R2 from the light source 200 is reflected by a sloped surface 1011 of the triangular-type reflection dot 101a of the light guide plate 101, and its reflected light R2 from the light emitting surface $S_{out}$ lightens the LCD panel 300. Also, as illustrated in (B) of FIG. 13, the triangular-type reflection dot 101a is constructed by a combination of planes, i.e., the triangular-type reflection dot 101a has two sloped surfaces 1011 and 1012 and side surfaces 1013 and 1014.

FIG. 14 illustrates a side-edge type surface lightening apparatus using a second prior art light guide plate, wherein (A) is an entire cross-sectional view, and (B) is a perspective view of the round-type reflection dot of (A).

In (A) of FIG. 14, provided on a light distribution controlling surface $S_{out}$ of a light guide plate 102 is a round-type reflection dot 102a which is a cone/trapezoid-type recess viewed from the side. Light R2 from the light source 200 is reflected by a sloped surface 1022 of the round-type reflection dot 102a of the light guide plate 102, and its reflected light R2 from the light emitting surface $S_{out}$ lightens the LCD panel 300. Also, as illustrated in (B) of FIG. 14, the round-type reflection dot 102a is cone/trapezoid-shaped, i.e., the round-type reflection dot 102a has a circular bottom surface 1021 and a sloped surface 1022 around the circular periphery thereof.

PRECEDING TECHNOLOGY LITERATURE

Patent Literature

Patent Literature 1: Japanese Patent Publication No. 2009-81094 (Japanese Patent No. 5066741)

Patent Literature 2: Japanese Patent Publication No. 2011-51285

SUMMARY OF THE INVENTION

Problems to be Solved by the Invention

In the first prior art light guide plate 101 as illustrated in FIG. 13, however, as illustrated in (A) of FIG. 15, although the sloped surface 1011 serves as an effective region ER that serves as a reflective surface of the light R1 from the light source 200, the sloped surface 1012 serves as an invalid region NR that cannot be expected as a reflective surface of the light R1, since the light R1 is hardly incident thereto. Also, as illustrated in (B) of FIG. 15, even when the light R1 of the light source 200 is incident to the side surfaces 1013 and 1014, their reflected light R2' does not proceed to the LCD panel 300. Therefore, the utilization of the light R1 of the light source 200 is low, i.e., there is room for the improvement of light taken-out efficiency. Further, as illustrated in (C) of FIG. 15, since the sloped surface 1011 is planar, the light R1 from the light source 200 particularly has multiple paths R1a, R1b and R1c, so that it is impossible to control the diffused reflection of reflected lights R2a, R2b and R2c toward the LCD panel 300, which would cause a luminance unevenness. This is a problem. Further, since multiple triangular reflection dots 101a are linearly arranged, they interfere with the linear elements such as connection patterns of the LCD panel 300 to easily generate moire. This is also another problem.

The problem of easily generating the above-mentioned moire is focused particularly in a front-light type display apparatus. In a back-light type display apparatus, a light diffusion sheet is inserted between a light guide plate and an LCD panel so as not to show up the elements bad-influencing the attractive moire. Contrary to this, in a front-light type display apparatus, when the light is diffused, the display of the LCD panel per se becomes invisible. Therefore, in a front-light type display apparatus, it is preferable to take measures to suppress the generation of moire.

On the other hand, in the second prior art light guide plate 102 as illustrated in FIG. 14, as illustrated in FIG. 16, although the sloped surface 1022-1 on the side of the light source 200 serves as an effective region ER that serves as a reflective surface of the light R1 from the light source 200, the sloped surface 1022-2 is provided on the opposite side of the light source 200 so that the sloped surface 1022-2 serves as an invalid region NR that cannot be expected as a reflective surface of the light R1, since the light R1 is hardly incident thereto. Also, since there is a circular bottom surface 1021, the invalid region NR is further increased. Therefore, the utilization of the light R1 of the light source 200 is low, i.e., the light taken-out efficiency is low, and also, the occupied area of the circular reflection dot 102 viewed from a plan view becomes large to decrease the light transmittance of the light guide plate 102. This is a problem.

Means for Solving the Problems

In order to solve the above-mentioned problems, a light guide plate according to the present invention has a transparent planar plate, an end face of the planar plate serving as a light incident surface, a principal face of the planar plate serving as a light emitting surface, a principal face opposite to the light emitting surface serving as a light distribution controlling surface, another end face opposite to the light incident surface serving as a counter light incident surface, wherein a concave pseudo half-spindle type reflection dot is provided in the light distribution controlling surface, the pseudo half-spindle type reflection dot comprising: a first curved sloped surface provided on a side of the light incident surface; and a second curved sloped surface provided on a side of the counter light incident surface against the first curved sloped surface and coupled to the first curved sloped surface, the first curved sloped surface forming a first circular arc shape viewed from the light distribution controlling surface, the second curved sloped surface forming a second circular arc shape viewed from the light distribution controlling surface, the first curved sloped surface forming a third circular arc shape viewed from the light incident surface, the second curved sloped surface forming the third circular arc shape viewed from the counter light incident surface, the curvature of the first circular arc shape being larger than the second circular arc shape.

A manufacturing method of the light guide plate according to the present invention comprises a concave dot metal mold mechanical processing step adapted to form multiple concave dots corresponding to multiple ones of the pseudo half-spindle type reflection dots in a metal mold, to mechanically process a concave dot metal mold.

Effect of the Invention

According to the present invention, there is provided a light guide plate where while the reduction of light taken-out efficiency is suppressed, the reduction of the transparency by the formation of reflection dots is deceased.

EMBODIMENTS

Figure 1:
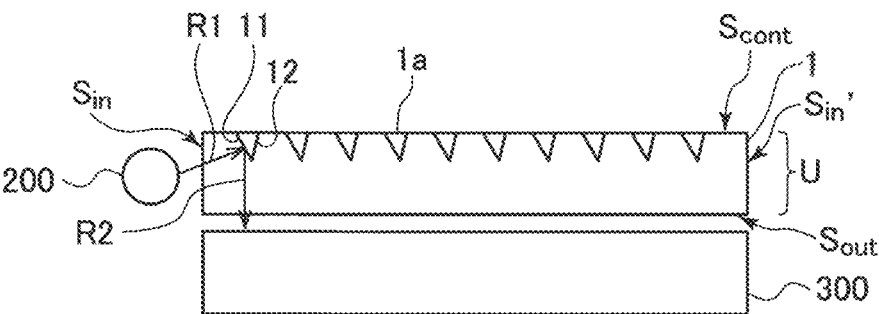
FIG. 1 is a cross-sectional view illustrating a side-edge type surface lightening apparatus including a first embodiment of the light guide plate according to the present invention.

FIG. 1 is a cross-sectional view illustrating a side-edge type surface lightening apparatus including a first embodiment of the light guide plate according to the present invention.

In FIG. 1, provided on a light distribution controlling surface $S_{cont}$ of a light guide plate 1 is a pseudo half-spindle type reflection dot 1a which is concave asymmetrically viewed from the side. That is, the pseudo half-spindle type reflection dot 1a has a curved sloped surface 11 on the side of a light incident surface $S_{in}$ and a curved sloped surface 12 on the side of a counter light incident surface $S_{in}'$ which are asymmetrical. Light R1 from the light source 200 is reflected by the curved sloped surface 11 of the pseudo half-spindle type reflection dot 1a, and its reflected light R2 lightens the LCD panel 300.

Figure 2:
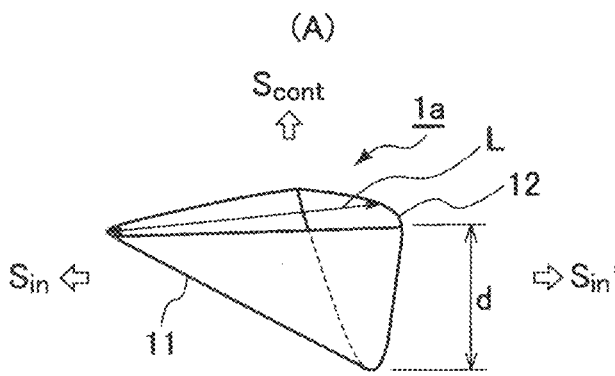
FIG. 2 is a detailed view of the pseudo half-spindle type reflection dot of FIG. 1, wherein (A) is a perspective view, (B) is a plan view viewed from the light distribution controlling surface, (C) is a side view, (D) is a front view viewed from the light incident surface, and (E) is a rear view viewed from the counter light incident surface.
Figure 2:
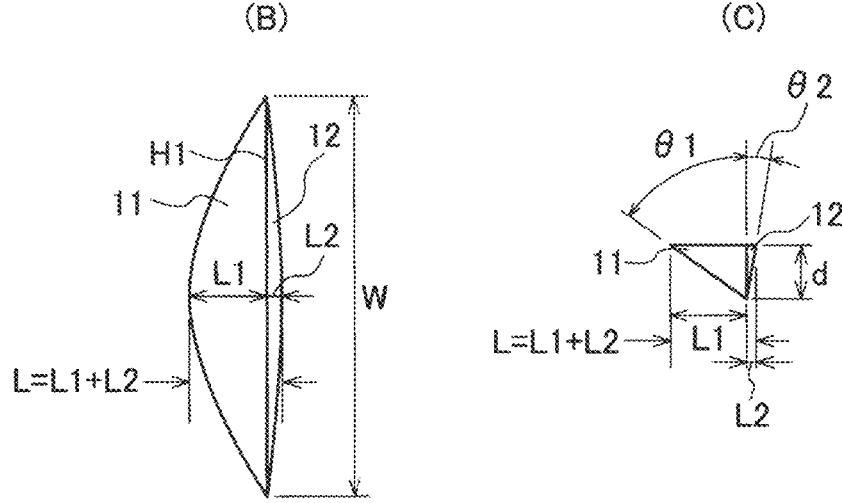
Figure 2:
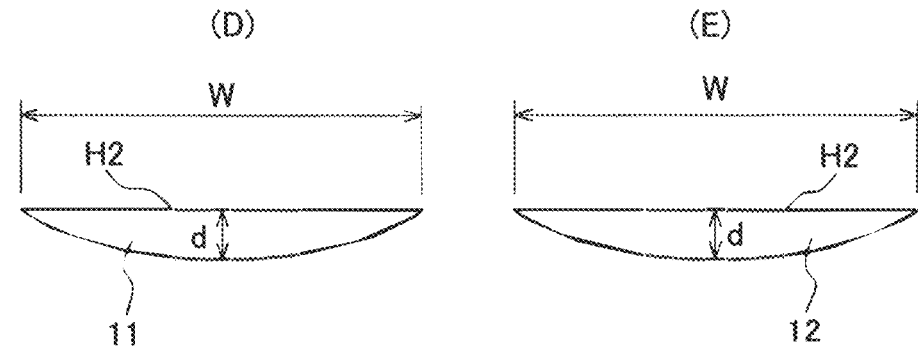

The pseudo half-spindle type reflection dot 1a of FIG. 1 will be explained with reference to FIG. 2. In FIG. 2, note that (A) is a perspective view, (B) is a plan view viewed from the light distribution controlling surface, (C) is a side view, (D) is a front view viewed from the light incident surface, and (E) is a rear view viewed from the counter light incident surface.

As illustrated in (A) and (B) of FIG. 2, the curved sloped surface 11, which forms part of the concave viewed from the light distribution controlling surface $S_{cont}$, forms a first circular arc shape whose contour shape projected onto the light distribution controlling surface $S_{cont}$ has a string H1 with a length (the lengthwise width of the pseudo half-spindle type reflection dot) W and a maximum camber (the depth of the string) L1, and the curved sloped surface 12, which forms part of the concave viewed from the light distribution controlling surface $S_{cont}$, forms a second circular arc shape that has the string H1 and a maximum camber L2. In this case, L=L1+L2 designates a depth of the pseudo half-spindle type reflection dot 1a viewed from the light incident surface $S_{in}$. Here, L1>L2, and therefore, the first circular arc shape defined by the length W and the maximum camber L1 is larger than the second circular arc shape defined by the length W and the maximum camber L2. That is, the curvature of the first circular arc shape is larger than that of the second circular arc shape. Also, (C) of FIG. 2 shows the contour shape obtained by projecting the pseudo half-spindle type reflection dot 1a onto a surface (the side surface of the light guide plate 1) perpendicular to the light incident surface $S_{in}$. In (C) of FIG. 2, assume that the angle of the contour of the curved sloped surface 11 against the normal of the light distribution controlling surface $S_{cont}$ is defined by θ 1, and the angle of the contour of the curved sloped surface 12 against the normal of the light distribution controlling surface $S_{cont}$ is defined by θ 2, then θ 1>θ 2. Note that the first and second circular arc shapes include a crescent shape, a half-moon shape and the like.

As illustrated in (D) of FIG. 2, the contour of the curved sloped surface 11 viewed from the light incident surface $S_{in}$, i.e., the contour obtained by projecting the curved sloped surface 11 onto the light incident surface $S_{in}$ forms a third circular arc shape defined by a string H2 length W and the depth d of the light guide plate 1 from the light distribution controlling surface $S_{cont}$, and also, as illustrated in (E) of FIG. 2, the contour of the curved sloped surface 12 viewed from the counter light incident surface $S_{in}'$, i.e., the contour obtained by projecting the curved sloped surface 12 onto the counter light incident surface $S_{in}'$ forms the same third circular arc shape defined by the string H2 of the length W and the depth d from the light distribution controlling surface $S_{cont}$. Note that the third circular arc shape includes a crescent shape, a half-moon shape and the like.

The first circular arc shape projected onto the light distribution controlling surface $S_{cont}$ has a curved surface connected smoothly from the string H1 to the third circular arc shape along the depth direction (the direction in parallel with the light incident surface $S_{in}$ of the light guide plate 1), to thereby form the curved sloped surface 11. Sinilarly, the second circular arc shape projected onto the light distribution controlling surface $S_{cont}$ has a curved surface connected smoothly from the string H2 (the same as the string H1) to the third circular arc shape along the depth direction (the direction in parallel with the light incident surface $S_{in}$ of the light guide plate 1), to thereby form the curved sloped surface 12.

As illustrated in FIG. 2, the pseudo half-spindle type reflection dot 1a combined by the curved sloped surfaces 11 and 12 is defined as follows:

W: the length of the contour shaped string H1 of the curved sloped surfaces 11 and 12 projected onto the light distribution controlling surface $S_{cont}$;

d: the depth of the curved sloped surfaces 11 and 12 from the light distribution controlling surface $S_{cont}$ of light guide plate 1;

θ 1: the sloped angle of the curved sloped surface 11 against the normal of the light distribution controlling surface $S_{cont}$; and θ 2: the sloped angle of the curved sloped surface 12 against the normal of the light distribution controlling surface $S_{cont}$, wherein θ 1>θ 2.

Thus, the pseudo half-spindle type reflection dot 1a is defined by four parameters W, d, θ 1 and θ 2 and the condition θ 1>θ 2. In this case, preferably, W=5~75 μm, for example, 30 μm;

d=1~10 μm, for example, 4 μm;

θ 1=30~89°, for example, 55°; and

θ 2=0~60°, for example, 10°.

When "W" and "d" are too small, the fluctuation by the processing precision is so large that the luminance would fluctuate. On the other hand, when "W" and "d" are too large, the reflection dot can be visible to the naked eye, which is not preferable in utilization of the light guide plate, particularly in a front-light purpose light guide plate. Also, when θ 1 is smaller than 30°, the amount of light reflected by the curved sloped surface 11 toward the emitting surface could be small. Further, when θ 1 equals 90°, the reflection dot is not realized. Further, when θ 2 exceeds 60°, the transparency of the light guide plate 1 could be decreased, which is not preferable.

Note that the maximum cambers L1 and L2 of the curved sloped surfaces 11 and 12 are approximately given by the following:

$$L1 = d \cdot \tan \theta 1$$

$$L2 = d \cdot \tan \theta 2$$

Therefore, the pseudo half-spindle type reflection dot 1a can be represented by four parameters W, d, L1 and L2 and the condition L1>L2.

Figure 3:
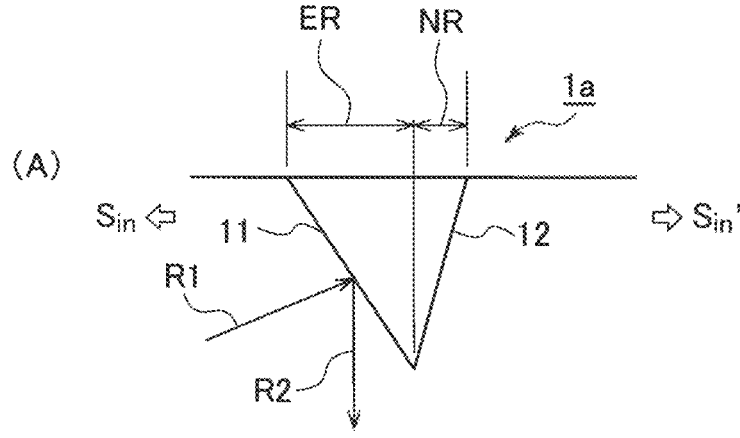
FIG. 3 is a diagram for explaining the effect of the light guide plate of FIG. 1.
Figure 3:
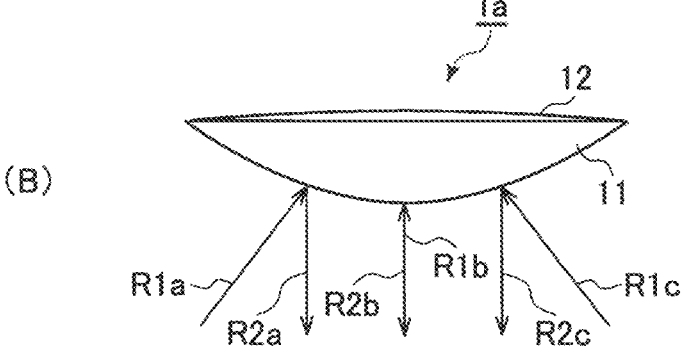

FIG. 3 is a diagram for explaining the effect of the light guide plate of FIG. 1.

As illustrated in (A) of FIG. 3, the curved sloped surface 11 serves as an effective region of the reflection surface of the light R1 from the light source 200, while, since the curved sloped surface 12 is located opposite to the light source 200 so that the light R1 of the light source 200 is hardly incident to the curved sloped surface 12. Thus, the curved sloped surface 12 serves as an invalid region; however, since the curved sloped surface 12 is smaller than the curved sloped surface 11, the invalid region is small. Also, as illustrated in (B) of FIG. 3, there is no side surface like the triangular type reflection dot 101. Therefore, the utilization of the light R1 of the light source 200 is high, i.e., the efficiency of taken-out light is high. Further, the number of linear constituent elements is smaller than that of the triangular type reflection dot 101, moire is hardly generated on the LCD panel 300.

Also, since there is no circular bottom surface 1021 as in the round type reflection dot 102a, the occupied area of the pseudo half-spindle type reflection dot 1a is small. Therefore, by forming the pseudo half-spindle type reflection dot 1a whose occupied area is smaller than the round type reflection dot 102a, the luminance of the light guide plate is maintained at an equivalent level as that of the prior art light guide plate where the round type reflection dot 102a is formed, a light guide plate having a high transparency can be realized.

Also, as illustrated in (B) of FIG. 3, particularly, when the light from the light source 200 has multiple light paths R1*a*, R1*b* and R1*c*, the light paths R2*a*, R2*b* and R2*c* towards the LCD panel 300 are controlled to be diffused, the luminance fluctuation can be decreased.

Figure 4:
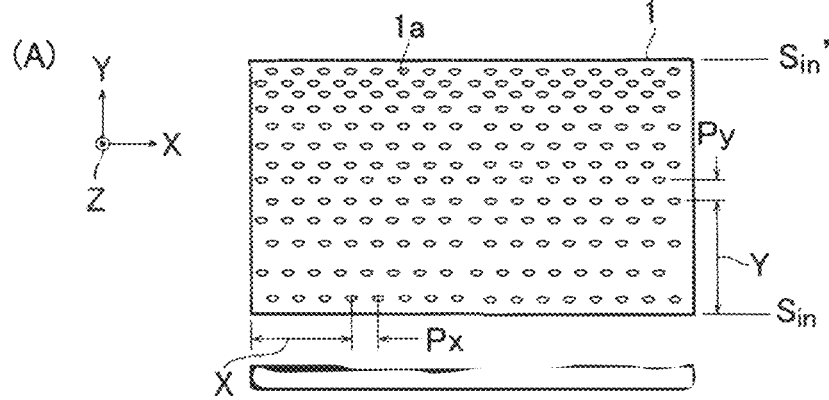
FIG. 4 illustrates the arrangement of the pseudo half-spindle type reflection dots on the light distribution controlling surface side of the light guide plate 1 of FIG. 1, where (A) is a plan view, (B) is a graph showing the change of the Y-direction pitch, and (C) shows the Y-direction pitch.
Figure 4:
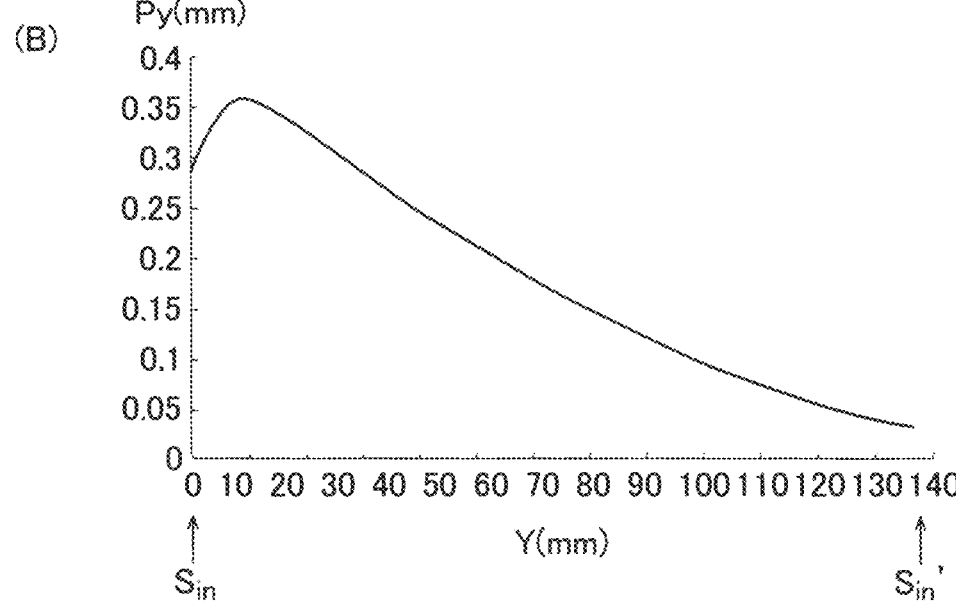
Figure 4:
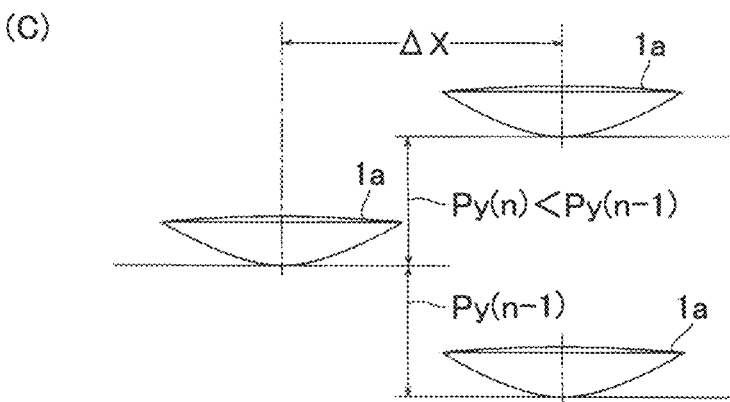

FIG. 4 illustrates the arrangement of the pseudo half-spindle type reflection dots on the light distribution controlling surface side of the light guide plate 1 of FIG. 1, where (A) is a plan view, (B) is a graph showing the change of the Y-direction pitch, and (C) shows the Y-direction pitch.

In (A) of FIG. 4, when multiple pseudo half-spindle type reflection dots 1*a* are arranged, the X-direction pitch $P_X$ is at a definite value such as 0.154 mm while the Y-direction pitch $P_Y$ is gradually decreased to increase the dot density since the light R1 of the light source 200 is weakened from the light incident surface $S_{in}$ to the counter light incident surface $S_{in}'$. Thus, the light R1 is made uniform from the light incident surface $S_{in}$ to the counter light incident surface $S_{in}'$. In this case, the X position of one dot is shifted by $\Delta X$ so the one dot that is not superposed onto another dot ahead of the one dot in the Y direction. Note that the pseudo half-spindle type reflection dots can be in a staggered arranged. Also, instead of changing the Y direction pitch $P_Y$, the Z direction depth d of the pseudo half-spindle type reflection dots 1*a* or the maximum camber L (=L1+L2) can be changed. To prevent local changes in luminance characteristics, the pseudo half-spindle type reflection dots are deformed to maintain their analogous shape when the Z direction depth d or the maximum camber L is changed.

Figure 5:
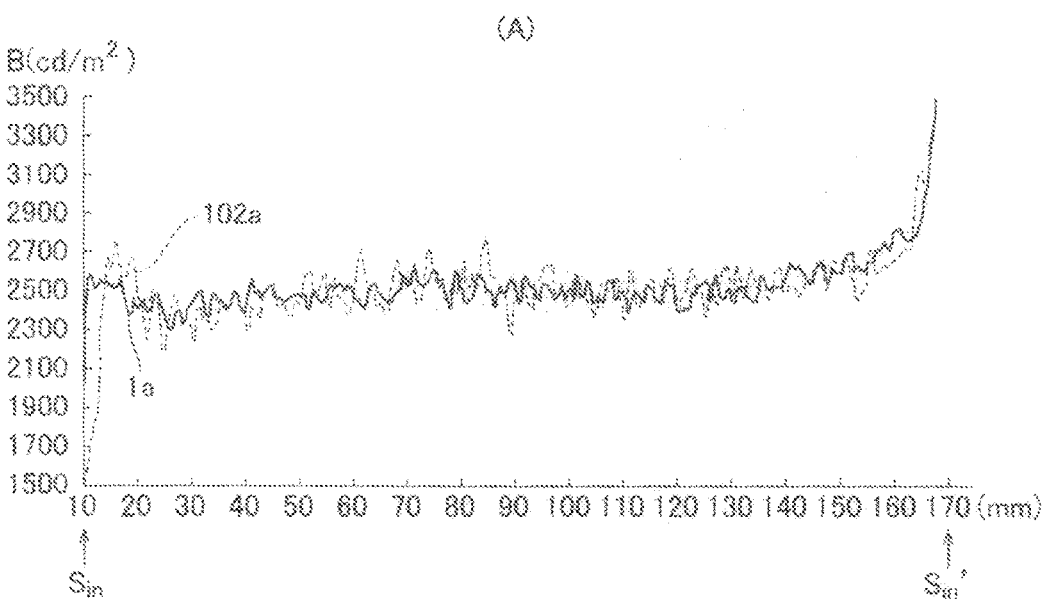
FIG. 5 is a diagram for explaining simulations of the comparison in luminance between the round-type reflection dot of FIG. 13 and the pseudo half-spindle type reflection dot of FIG. 1, where (A) shows luminance distributions of emitted light from the light incident surface to the counter light incident surface, (B)-1 shows the depth 4 μm of the round-type reflection dot 102a of FIG. 13, (B)-2 shows the Z-direction depth d=4 μm of the pseudo half-spindle type reflection dot 1a of FIG. 1, (C)-1 shows an arrangement of the round-type reflection dots 102a in the light guide plate of FIG. 13 viewed from the plan side, (C)-2 shows an arrangement of the half-spindle type reflection dots 1a in the light guide plate of FIG. 1 viewed from the plan side.
Figure 5:
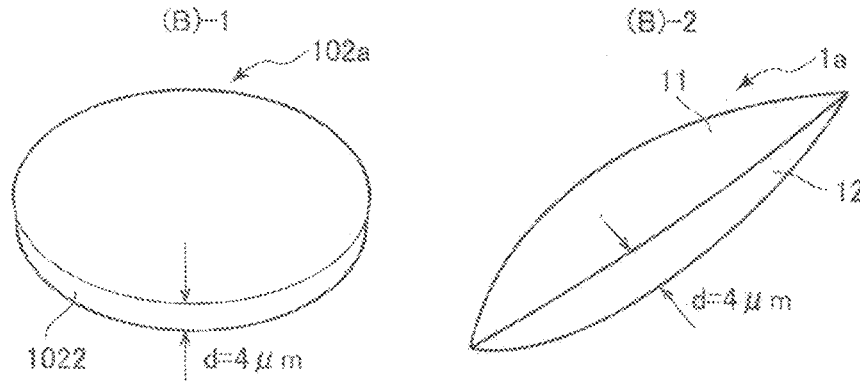
Figure 5:
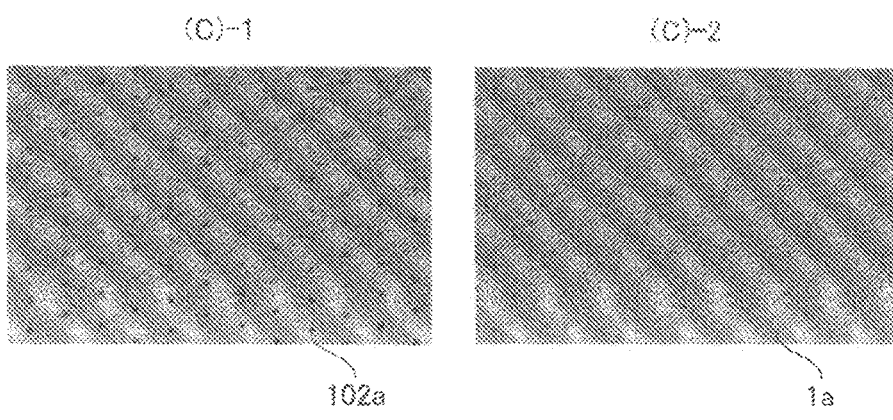
Figure 13:
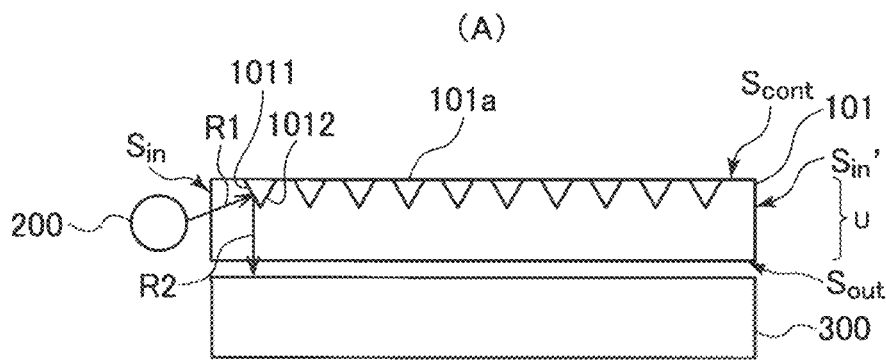
FIG. 13 illustrates a side-edge type surface lightening apparatus including a first prior art light guide, where (A) is an entire perspective view, and (B) is an enlarged perspective view of the triangular-type reflection dot of (A).
Figure 13:
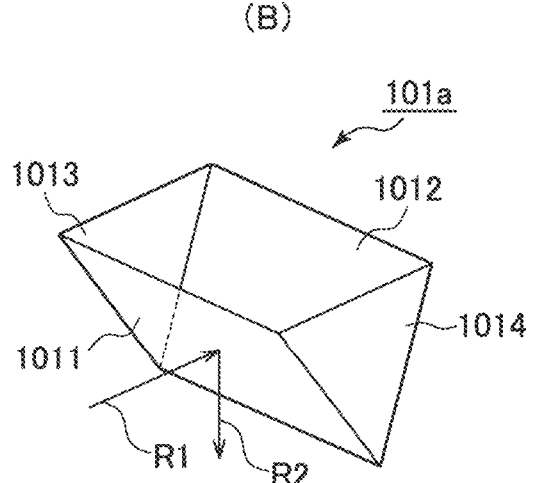
Figure 14:
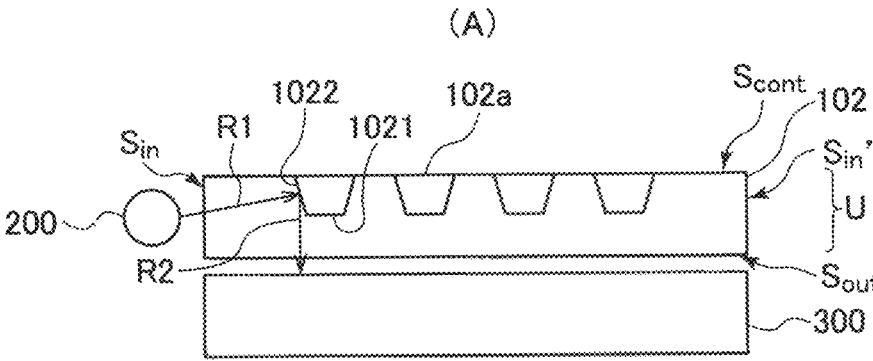
FIG. 14 illustrates a side-edge type surface lightening apparatus including a second prior art light guide, where (A) is an entire perspective view, and (B) is an enlarged perspective view of the round-type reflection dot of (A).
Figure 14:
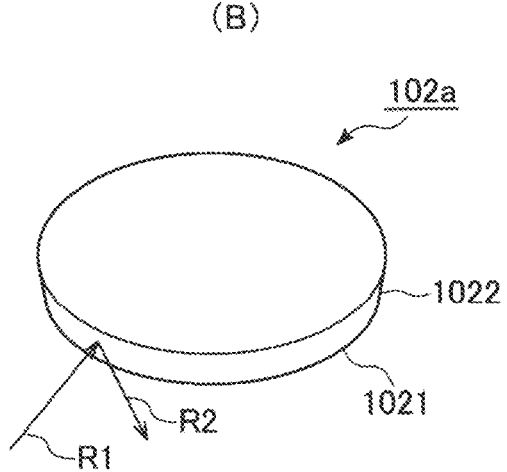
Figure 15:
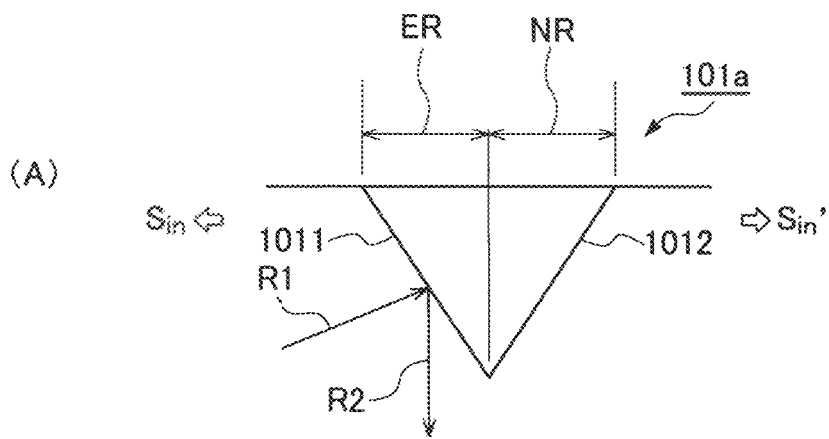
FIG. 15 is a diagram for explaining the problem in the light guide plate of FIG. 13.
Figure 15:
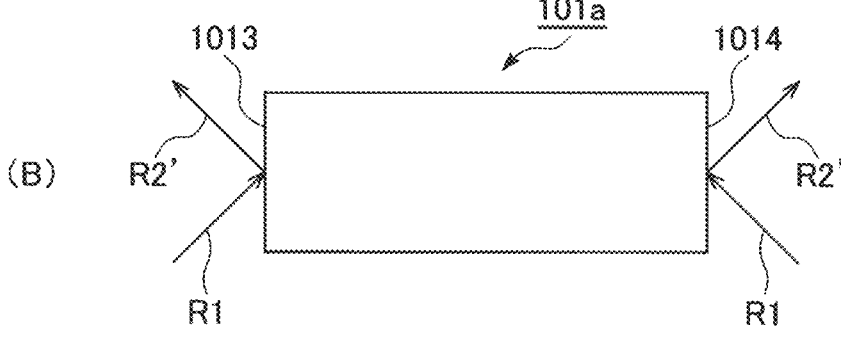
Figure 15:
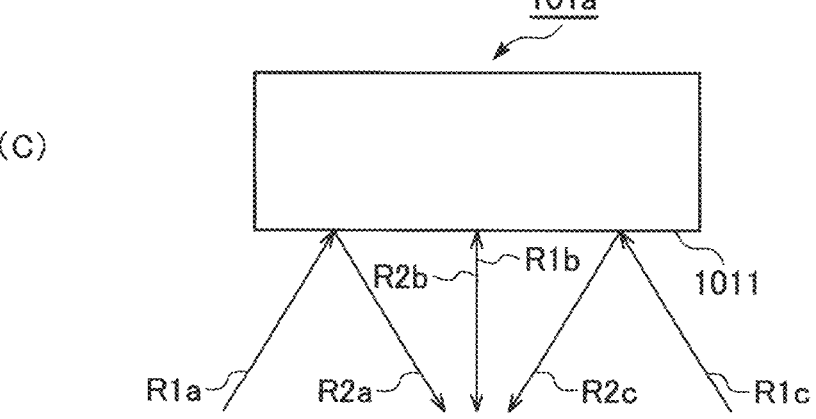
Figure 16:
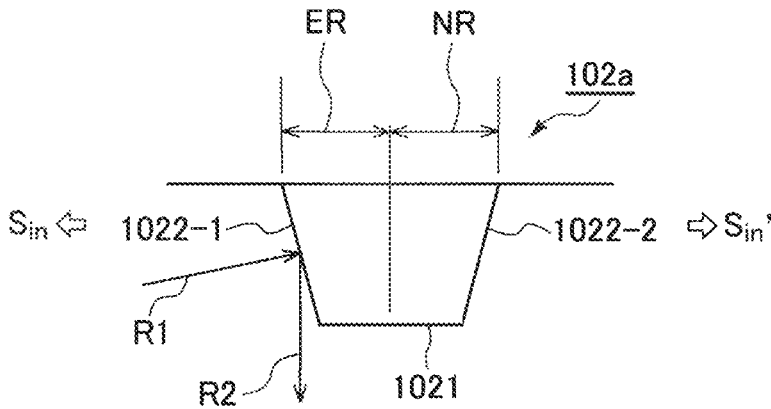
FIG. 16 is a diagram for explaining the problem in the light guide plate of FIG. 14.

FIG. 5 is a diagram for explaining simulations of the comparison in luminance between the round-type reflection dot of FIG. 13 and the pseudo half-spindle type reflection dot of FIG. 1, where (A) shows light distributions of emitted light from the light incident surface $S_{in}$ to the counter light incident surface $S_{in}'$, (B)-1 shows the Z-direction depth d=4 μm of the round-type reflection dot 102*a* of FIG. 13, (B)-2 shows the Z-direction depth d=4 μm of the pseudo half-spindle type reflection dot 1*a* of FIG. 1, (C)-1 shows an arrangement of the round-type reflection dots 102*a* in the light guide plate of FIG. 13 viewed from the plan side, (C)-2 shows an arrangement of the half-spindle type reflection dots 1*a* in the light guide plate of FIG. 1 viewed from the plan side. In (B)-1 and (B)-2 of FIG. 5, the Z-direction depth of the reflection dots is the same. When comparing for an interval from the location 20 [mm] to the location 170 [mm] from the light incident surface $S_{in}$, which is a section where the luminance of the light guide plate is approximately the same, the pattern area A [mm$^2$] per one reflection dot was $7.68 \times 10^{-4}$ [mm$^2$] in the case of the round-type reflection dot 102*a* from (C)-1 of FIG. 5, and the pattern area A [mm$^2$] per one reflection dot was $1.39 \times 10^{-4}$ [mm$^2$] in the case of the pseudo half-spindle type reflection dots 1*a* from (C)-2 of FIG. 5. Also, the number (N) of dots within the same pattern area (B=1574 [mm$^2$] was 66563 in the case of the round-type reflection dot 102*a* from (C)-1 of FIG. 5, and was 225438 in the case of the pseudo half-spindle type reflection dots 1*a* from (C)-2 of FIG. 5. Therefore, the area ratio (the ratio of reflection dots occupying this area)=A×N÷B was 3.25% in the round-type reflection dot 102*a* and 1.99% in the pseudo half-spindle type reflection dots 1*a*. That is, as compared with the round-type reflection dot 102*a*, the pseudo half-spindle type reflection dots 1*a* has a higher light take-out efficiency per dot formation area and can realize a light guide plate with a higher transparency maintaining the luminance of the light guide plate at the same degree as the prior art.

As a manufacturing method of metal molds used in the manufacture of the light guide plate 1 of the pseudo half-spindle type reflection dots 1*a*, a super precision mechanical processing method mounts a diamond cutter tool on a piezoelectric element unit to form concave dots in a metal mold (see: Patent Literature 2). According to this method, since the surface of the reflection dot 1*a* can be made a mirror surface, it is possible to precisely control the light distribution by the pseudo half-spindle type reflection dots 1*a*. In addition, its manufacturing apparatus is inexpensive as compared with an apparatus using the photolithography processing apparatus.

Figure 6:
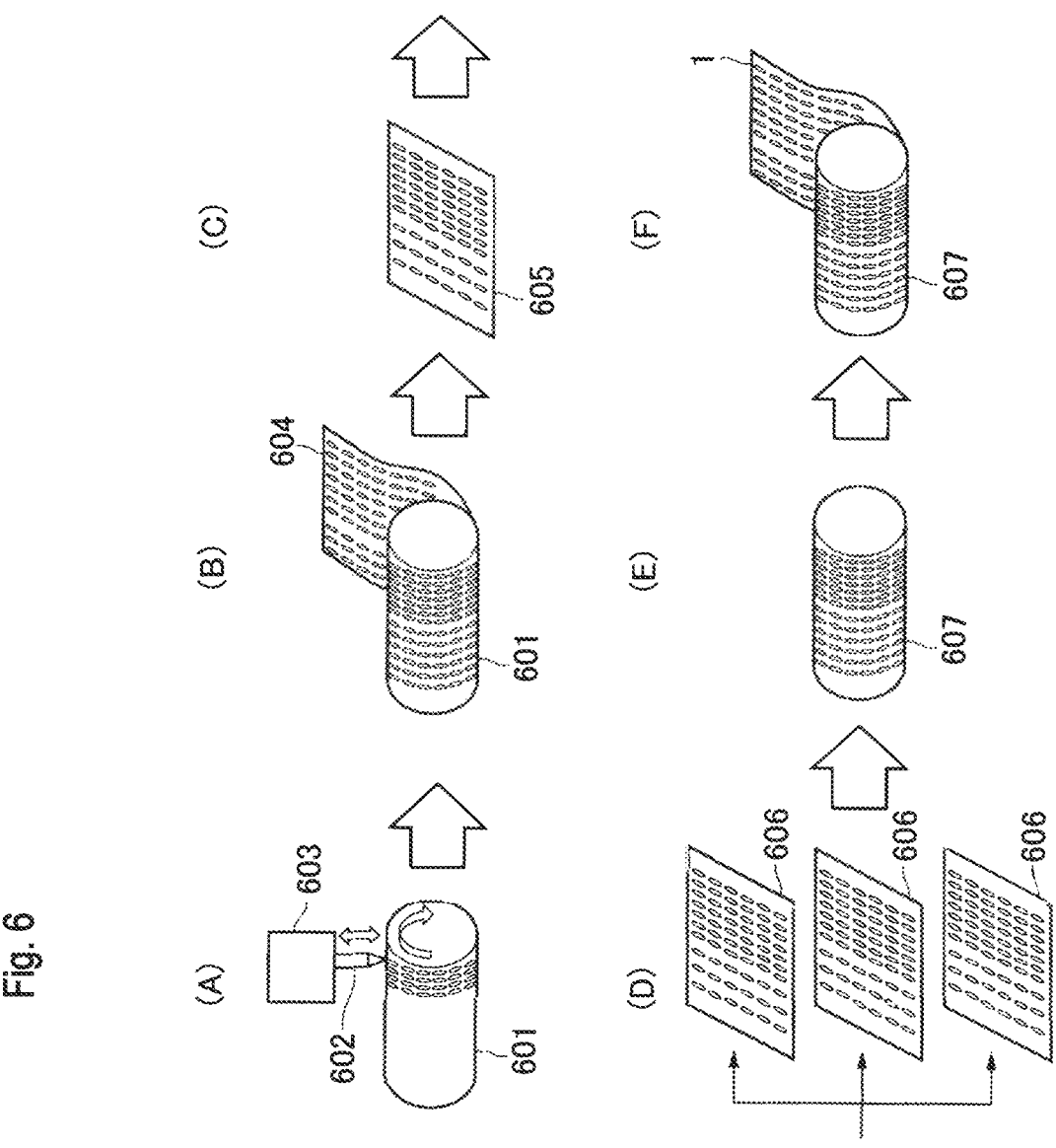
FIG. 6 is a diagram for explaining a manufacturing method of the light guide plate of FIG. 1.

FIG. 6 is a diagram for explaining a manufacturing method of the light guide plate of FIG. 1.

Figure 7:
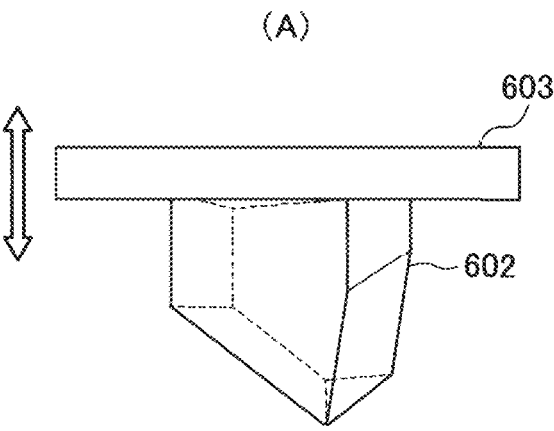
FIG. 7 is a diagram for explaining the relationship between the components used in a precision roll mechanical processing step, where (A) shows the relationship between the diamond cutter and the piezoelectric element unit, and (B) shows the relationship between the concave dot metal mold and the diamond cutter.
Figure 7:
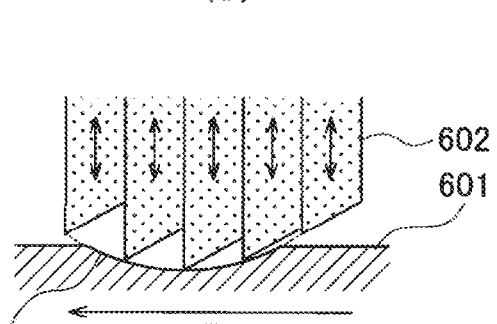

First, referring to a super precision roll mechanical processing step as illustrated in (A) of FIGS. 6 and (A) and (B) of FIG. 7, a cylindrical metal mold 601 plated with copper, brass or the like is rotated in a rotational direction F and a diamond cutting tool 602 is moved by a piezoelectric element unit (FTS) 603 along an up/down depth direction as indicated by an arrow shown in (B) of FIG. 7, so that a concave dot corresponding to the pseudo half-spindle type reflection dot 1*a* is formed. Thus, a concave dot metal mold 601 is obtained. Instead of the diamond cutting tool 602 and the piezoelectric element unit 603, a processing machine such as a precision lathe and a precision plate cutting unit can be used.

Next, referring to (B) of FIG. 6 which shows a resin sheet inverting step, a dot inversion is carried out by using the concave dots of the concave dot metal mold 601 as a parent to obtain a convex dot resin sheet 604.

Next, referring to (C) of FIG. 6 which shows an electroforming inverting step, an electroforming inversion is carried out by using the convex metal mold 604 as a parent to obtain a concave dot resin sheet 605.

Next, referring to (D) of FIG. 6 which shows an electroforming inverting step, an electroforming inversion is carried out by using the concave dot resin sheet 605 as a parent to obtain convex dot resin sheets 606. Note multiple convex dot resin sheets 606 realize stampers (mass-production patterns).

Next, referring to a roll metal mold forming step as illustrated in (E) of FIG. 6, a metal mold is wound by the convex dot resin sheets 606 to obtain a convex dot metal mold 607.

Finally, referring to (F) of FIG. 6, multiple pseudo half-spindle type reflection dots 1*a* are simultaneously formed by the convex dot metal mold 607 on the light distribution controlling surface $S_{cont}$ of the light guide plate 1.

According to the manufacturing method as illustrated in FIG. 6, the concave dot surface of the concave dot metal mold 601 is made a three-dimensional mirror-surface by the fine cutting due to the diamond cutting tool 602, so that the pseudo half-spindle type reflection dot 1*a* also has a mirror surface by using the concave dot metal mold 601, thus precisely distributing the light. Also, since the diamond cutting tool 602 can be reciprocated along the depth direction by the piezoelectric element unit 603, so that a concave dot can be engraved by the diamond cutting tool 602 at a high speed in the metal mold 601. Thus, a concave dot process can be performed upon the metal mold 601 in a short time.

Figure 8:
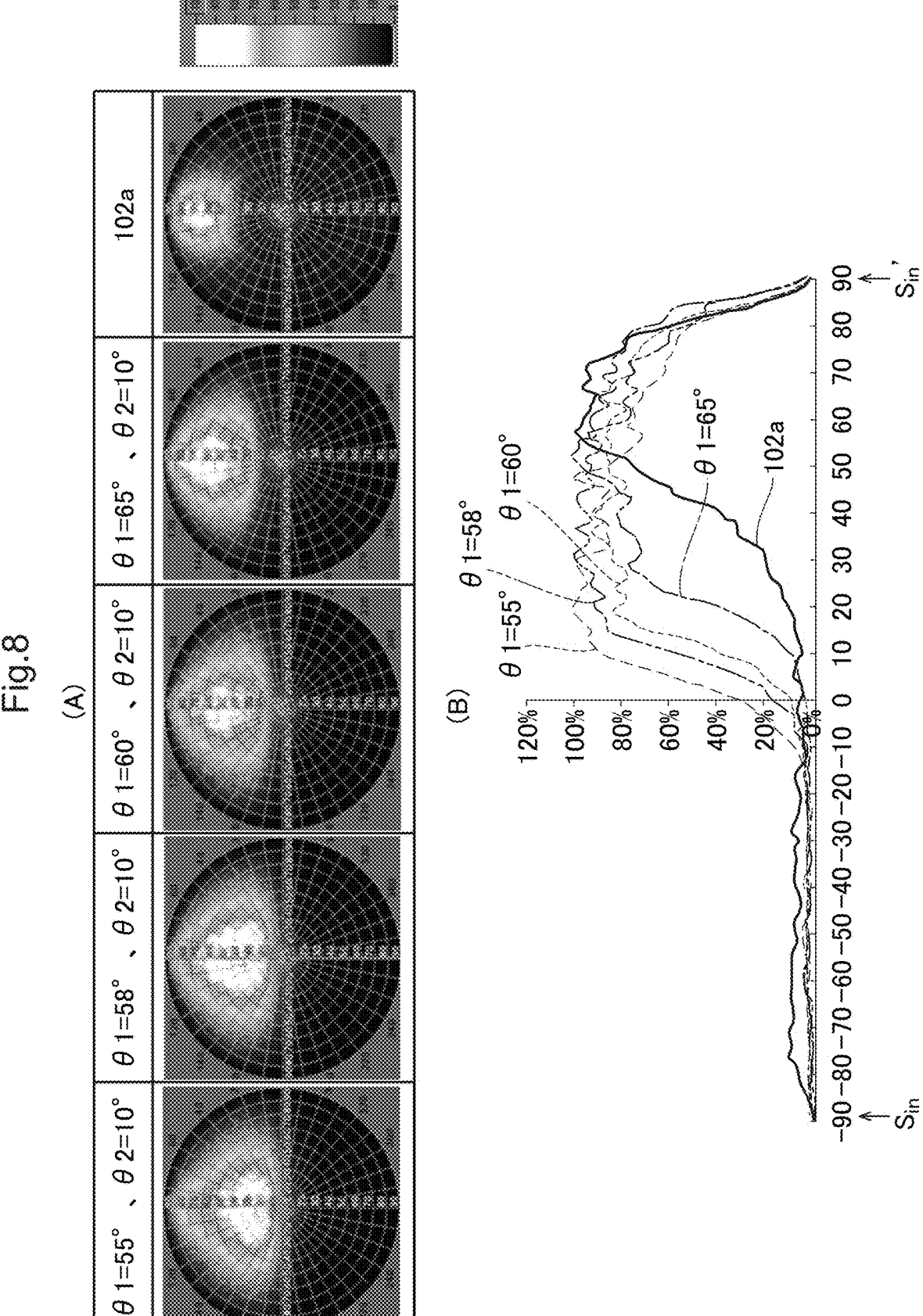
FIG. 8 is a diagram for explaining the light distribution of the light guide plate of FIG. 1, where (A) shows a polar coordinate representation, and (B) shows a two-dimensional representation.

FIG. 8 is a diagram for explaining the light distribution of the light guide plate of FIG. 1, where (A) shows a polar coordinate representation, and (B) shows a two-dimensional representation.

As illustrated in FIG. 8, while the angle θ2 of the curved sloped surface 12 is fixed at 10°, the angle θ1 of the curved sloped surface 11 is changed at 55°, 58°, 60° and 65°, thus changing the light distribution. Particularly, in the manufacturing method, the angle θ 1 of the curved sloped surface 11 can be changed by changing the edge tool angle of the diamond cutting tool 602 or the direction of the diamond cutting tool 602 perpendicular to the cutting direction, thus changing the light distribution. As a result, as occasion demands, the efficiency of the back-light can be changed. In any case, the light distribution is excellent as compared with the light distribution using the round-type reflection dot 102*a*.

For example, the larger θ 1, the larger the light distribution characteristics to the counter light incident surface S$_{in}$'. When the eye point is set closer to the counter light incident surface S$_{in}$' than the center of the light guide plate along the Y-direction, θ 1 is made larger to increase the amount of the reflected light R2 on the side of the counter light incident surface S$_{in}$', thus improving the visibility of the display apparatus at the eye point. In any case, the light distribution is excellent as compared with the light distribution using the round-type reflection dot 102*a*.

On the contrary, when the eye point is set closer to the light incident surface S$_{in}$ than the center of the light guide plate along the Y-direction, θ 1 is smaller to increase the reflected light R2 on the light incident surface S$_{in}$, thus improving the display apparatus at the eye point.

Preferably, since the larger θ 1, the higher the reflectivity, when an expected eye point is deviated from the center of the light guide plate along the Y-direction, the positions of the light source 200 and the light incident surface S$_{in}$ are set on an opposite side of the eye point along the Y-direction, to improve the utilization of light.

Also, the angle θ 1A of a reflection dot of the curved sloped surface 11 near the light source along the Y-direction is set to be large, the angle θ 1B of a reflection dot of the curved sloped surface closer to a region immediate below the eye point along the Y-direction is made smaller than θ 1A, and the angle θ 1C of a reflection dot of the curved sloped surface in a region behind the region immediate below the eye point along the Y-direction is made smaller than θ 1B. Thus, the light distribution can be focused toward the eye point of the display apparatus.

On the contrary, the angle θ 1A of a reflection dot of the curved sloped surface 11 near the light source along the Y-direction is set to be small, the angle θ 1B of a reflection dot of the curved sloped surface closer to a region immediate below the eye point along the Y-direction is made larger than θ 1A, and the angle θ 1C of a reflection dot of the curved sloped surface in a region behind the region immediate below the eye point along the Y-direction is made larger than θ 1B. Thus, the visible angle can be increased.

Figure 9:
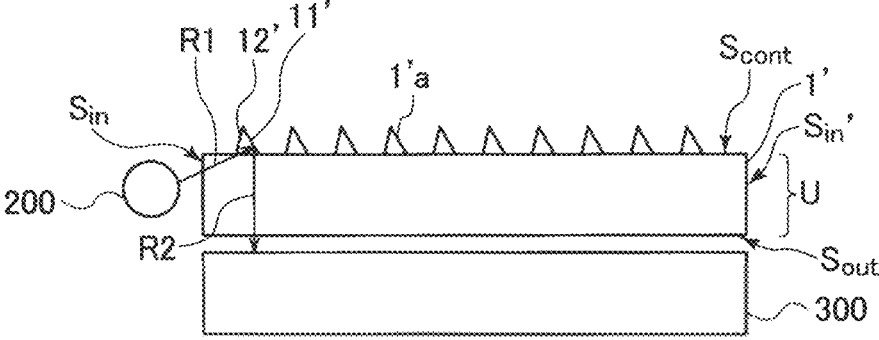
FIG. 9 is a cross-sectional view illustrating a side-edge type surface lightening apparatus including a second embodiment of the light guide plate according to the present invention.

FIG. 9 is a cross-sectional view illustrating a side-edge type surface lightening apparatus including a second embodiment of the light guide plate according to the present invention.

In FIG. 9, provided on a light distribution controlling surface S$_{cont}$ of a light guide plate 1' is a pseudo half-spindle type reflection dot 1'*a* which is convex asymmetrically viewed from the side. That is, the pseudo half-spindle type reflection dot 1'*a* has a curved sloped surface 11' on the side of a counter light incident surface S$_{in}$' and a curved sloped surface 12' on the side of a light incident surface S$_{in}$ which are asymmetrical. Light R1 from the light source 200 is reflected by the curved sloped surface 11' of the pseudo half-spindle type reflection dot 1'*a*, and its reflected light R2 lightens the LCD panel 300.

Figure 10:
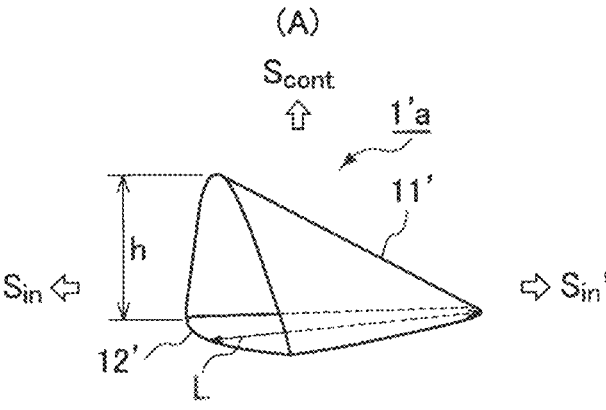
FIG. 10 is a detailed view of the pseudo half-spindle type reflection dot of FIG. 9, wherein (A) is a perspective view, (B) is a plan view viewed from the light distribution controlling surface, (C) is a side view, (D) is a front view viewed from the light incident surface, and (E) is a rear view viewed from the counter light incident surface.
Figure 10:
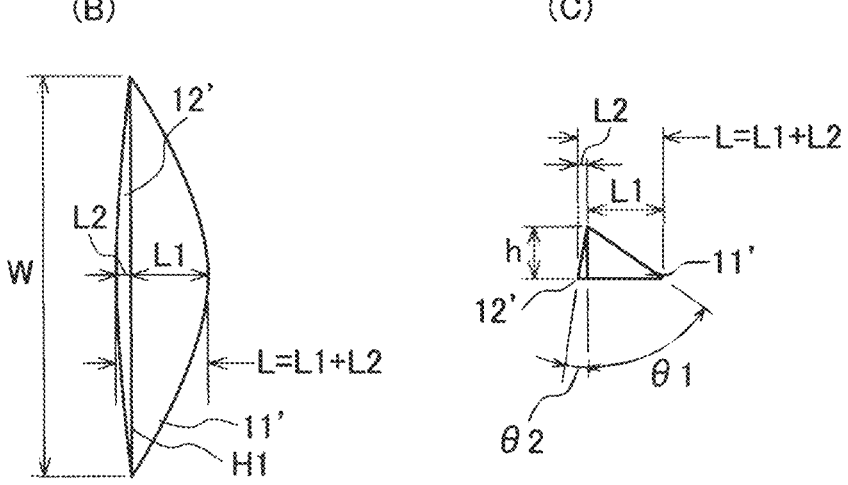
Figure 10:
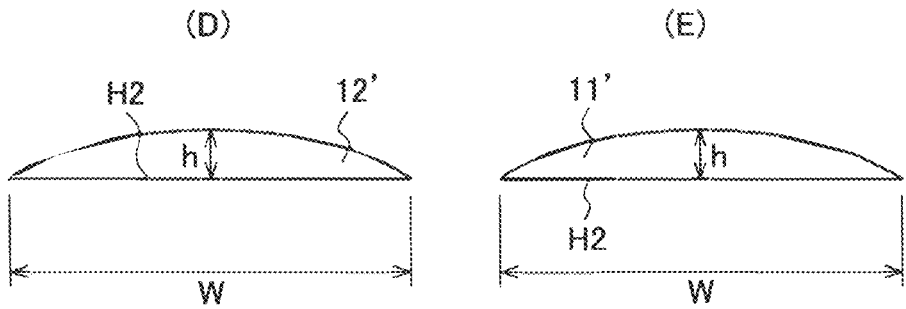

The pseudo half-spindle type reflection dot 1'*a* of FIG. 9 will be explained with reference to FIG. 10. In FIG. 10, note that (A) is a perspective view, (B) is a plan view viewed from the light distribution controlling surface, (C) is a side view, (D) is a front view viewed from the light incident surface, and (E) is a rear view viewed from the counter light incident surface.

As illustrated in (A) and (B) of FIG. 10, the curved sloped surface 11' with a convex viewed from the light distribution controlling surface S$_{cont}$ forms a first circular arc shape whose contour shape projected onto the light distribution controlling surface S$_{cont}$ has a string H1 with a length (the lengthwise width of the pseudo half-spindle type reflection dot) W and a maximum camber (the depth of the string) L1, and the curved sloped surface 12 with a convex viewed from the light distribution controlling surface S$_{cont}$ forms a second circular arc shape that has the string H1 and a maximum camber L2. In this case, L=L1+L2 designates a depth of the pseudo half-spindle type reflection dot 1'*a* viewed from the light incident surface S$_{in}$. Here, L1>L2, and therefore, the first circular arc shape defined by the length W and the maximum camber L1 is larger than the second circular arc shape defined by the length W and the maximum camber L2. That is, the curvature of the first circular arc shape is larger than that of the second circular arc shape. Also, (C) of FIG. 10 shows the contour shape obtained by projecting the pseudo half-spindle type reflection dot 1'*a* onto a surface (the side surface of the light guide plate 1') perpendicular to the light incident surface S$_{in}$. In (C) of FIG. 10, assume that the angle of the contour of the curved sloped surface 11' against the normal of the light distribution controlling surface S$_{cont}$ is defined by θ 1, and the angle of the contour of the curved sloped surface 12' against the normal of the light distribution controlling surface S$_{cont}$ is defined by θ 2, then θ 1>θ 2. Note that the first and second circular arc shapes include a crescent shape, a half-moon shape and the like.

As illustrated in (D) of FIG. 10, the contour of the curved sloped surface 12' viewed from the light incident surface S$_{in}$, i.e., the contour obtained by projecting the curved sloped surface 12' onto the light incident surface S$_{in}$ forms a third circular arc shape defined by a string H2 with a length W and the height h of the light guide plate 1' from the light distribution controlling surface S$_{cont}$, and also, as illustrated in (E) of FIG. 10, the contour of the curved sloped surface 11' viewed from the counter light incident surface S$_{in}$', i.e., the contour obtained by projecting the curved sloped surface 11' onto the counter light incident surface S$_{in}$' forms the same third circular arc shape defined by the string H2 of the length W and the height h from the light distribution controlling surface S$_{cont}$. Note that the third circular arc shape includes a crescent shape, a half-moon shape and the like.

As illustrated in FIG. 10, the pseudo half-spindle type reflection dot 1'*a* combined by the curved sloped surfaces 11' and 12' is defined as follows:

W: the length of the contour shaped string H1 of the curved sloped surfaces 11' and 12' projected onto the light distribution controlling surface S$_{cont}$;

h: the height of the curved sloped surfaces 11' and 12' from the light distribution controlling surface S$_{cont}$ of light guide plate 1';

θ 1: the sloped angle of the curved sloped surface 11' against the normal of the light distribution controlling surface S$_{cont}$; and θ 2: the sloped angle of the curved sloped surface 12' against the normal of the light distribution controlling surface $S_{cont}$ wherein θ 1>θ 2.

Thus, the pseudo half-spindle type reflection dot 1'$a$ is also defined by four parameters W, h, θ 1 and θ 2 and the condition θ 1>θ 2.

In this case, preferably,

W=5~75 μm, for example, 30 μm;

h=1~10 μm, for example, 4 μm;

θ 1=30~89°, for example, 55°; and

θ 2=0~60°, for example, 10°.

When "W" and "h" are too small, the fluctuation by the processing precision is so large that the luminance would fluctuate. On the other hand, when "W" and "d" are too large, the reflection dot can be visible to the naked eye, which is not preferable in utilization of the light guide plate, particularly in a front-light purpose light guide plate. Also, when θ 1 is smaller than 30°, the amount of light reflected by the curved sloped surface 11' toward the emitting surface would be small. Further, when θ 1 equals 90°, the reflection dot is not realized. Further, when θ 2 exceeds 60°, the transparency of the light guide plate 1' would be decreased, which is not preferable.

Note that the maximum cambers L1 and L2 of the curved sloped surfaces 11' and 12' are approximately given by the following:

$$L1 = h \cdot \tan \theta 1$$

$$L2 = h \cdot \tan \theta 2$$

Therefore, the pseudo half-spindle type reflection dot 1'$a$ can be represented by four parameters W, h, L1 and L2 and the condition L1>L2.

The pseudo half-spindle type reflection dot 1'$a$ has a similar effect to that of the pseudo half-spindle type reflection dot 1$a$ of FIG. 1.

Figure 11:
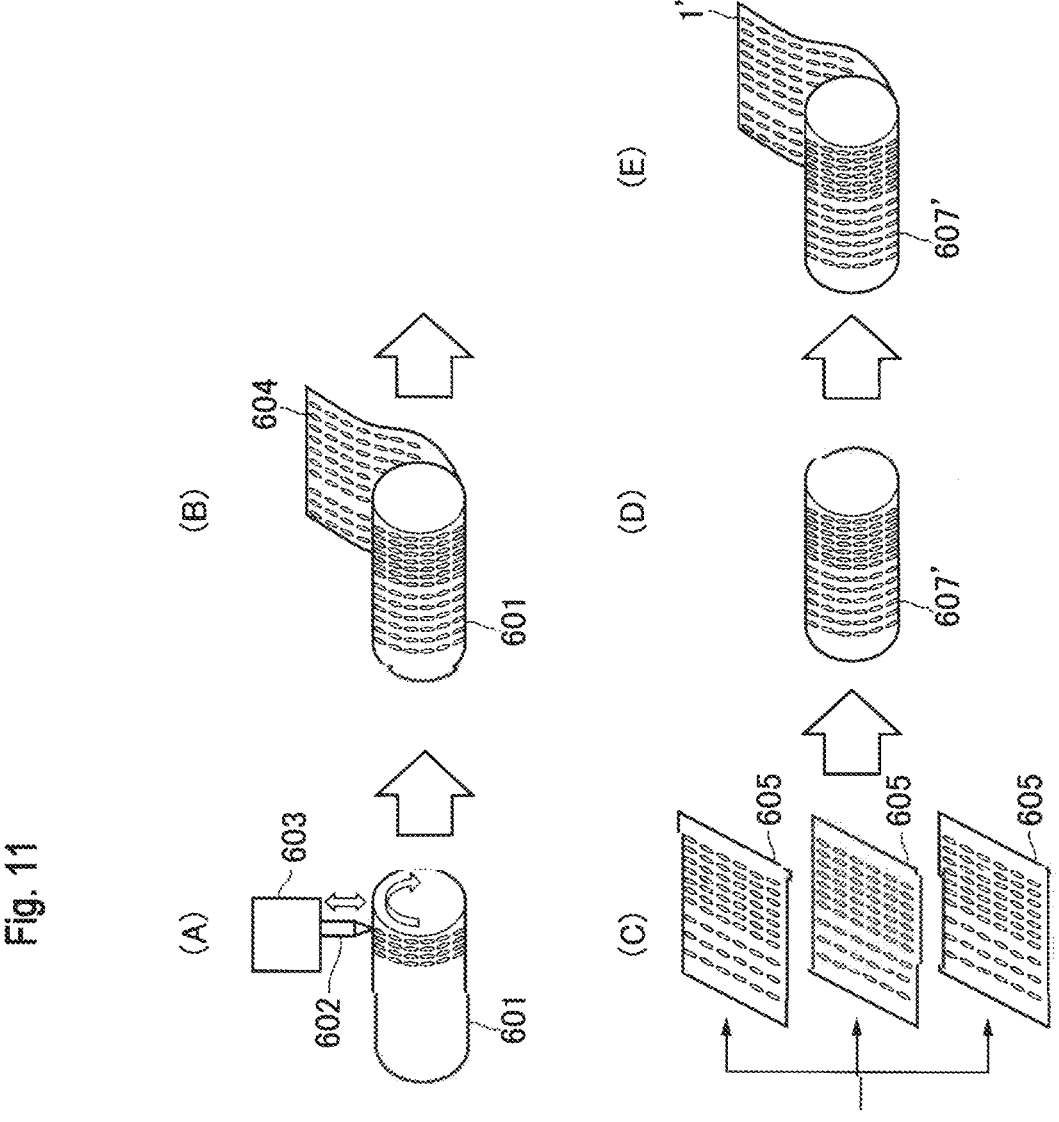
FIG. 11 is a diagram for explaining a manufacturing method of the light guide plate of FIG. 9.
Figure 12:
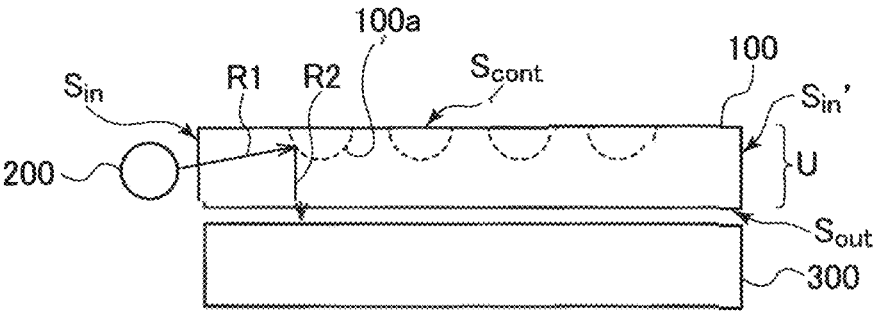
FIG. 12 is an entire perspective view illustrating a general side-edge type surface lightening apparatus.

FIG. 11 is a diagram for explaining a manufacturing method of the light guide plate of FIG. 9. In FIG. 11, the number of electroforming inverting steps is smaller than that of electroforming inverting steps of the manufacturing method of FIG. 6. That is, there is only one electroforming inverting step.

First, referring to a super precision roll mechanical processing step as illustrated in (A) of FIG. 11, a cylindrical metal mold 601 plated with copper, brass or the like is rotated and a diamond cutting tool 602 is moved by a piezoelectric element unit (FTS) 603 along an up/down depth direction, so that a concave dot corresponding to the pseudo half-spindle type reflection dot 1'$a$ is formed. Thus, a concave dot metal mold 601 is obtained.

Next, referring to (B) of FIG. 11 which shows a resin sheet inverting step, a dot inversion is carried out by using the concave dots of the concave dot metal mold 601 as a parent to obtain a convex dot resin sheet 604.

Next, referring to (C) of FIG. 11 which shows an electroforming inverting step, an electroforming inversion is carried out by using the convex metal mold 604 as a parent to obtain a concave dot resin sheet 605. Note that multiple concave dot sheets realize stampers (mass-production patterns).

Next, referring to (D) of FIG. 11 which shows a roll metal mold forming step, a metal mold is wound by the concave dot resin sheets 605 to obtain a concave dot metal mold 607'.

Finally, referring to (E) of FIG. 11, multiple pseudo half-spindle type reflection dots 1'$a$ are simultaneously formed by the concave dot metal mold 607' on the light distribution controlling surface $S_{cont}$ of the light guide plate 1'.

Note that the present invention can be applied to any alterations within the obvious scope of the above-mentioned embodiments.

POSSIBILITY OF UTILIZATION IN INDUSTRY

The light guide plate according to the present invention can be applied to a light guide plate for a front-light such as an electrophoresis display in addition to a light guide plate for a back-light. Also, it can be utilized as a backlight by changing the optical sloped shape of dots. Further, since letters, signs such as patterns are lightened and the light distribution can be toward the front direction, the light guide plate according to the present invention can be applied to an illumination apparatus of automobiles.

DESCRIPTION OF THE SYMBOLS

U: side-edge type surface lightening apparatus

100, 101, 102, 1, 1': light guide plate $S_{in}$: light incident surface $S_{out}$: light emitting surface $S_{cont}$: light distribution controlling surface $S_{in}{}'$: counter light incident surface

200: light source

300: liquid crystal display (LCD) panel

1$a$, 1'$a$: pseudo half-spindle type reflection dot

11, 12, 11', 12': curved sloped surface

601: concave dot metal mold

602: diamond cutting tool

603: piezoelectric element unit

604: convex dot resin sheet

605: concave dot resin sheet

606: convex dot resin sheet

607: convex dot metal mold

607': concave dot metal mold

100$a$: reflection dot

101$a$: triangular-type reflection dot

1011, 1012: sloped surface

1013, 1014: side surface

102$a$: round-type reflection dot

1021: circular bottom surface

1022: sloped surface

R1: incident light

R2: reflected light

The invention claimed is:

1. A light guide plate having a transparent planar plate, an end face of said planar plate serving as a light incident surface, a principal face of said planar plate serving as a light emitting surface, a principal face opposite to said light emitting surface serving as a light distribution controlling surface, another end face opposite to said light incident surface serving as a counter light incident surface, wherein a concave pseudo half-spindle type reflection dot is provided in said light distribution controlling surface, said pseudo half-spindle type reflection dot comprising:

a first curved sloped surface provided on a side of said light incident surface; and a second curved sloped surface provided on a side of said counter light incident surface against said first curved sloped surface and coupled to said first curved sloped surface, said first curved sloped surface forming a first circular arc shape viewed from said light distribution controlling surface, said second curved sloped surface forming a second circular arc shape viewed from said light distribution controlling surface, said first curved sloped surface forming a third circular arc shape viewed from said light incident surface, said second curved sloped surface forming said third circular arc shape viewed from said counter light incident surface, said second curved sloped surface being smaller than said first curved sloped surface.

2. A light guide plate having a transparent planar plate, an end face of said planar plate serving as a light incident surface, a principal face of said planar plate serving as a light emitting surface, a principal face opposite to said light emitting surface serving as a light distribution controlling surface, another end face opposite to said light incident surface serving as a counter light incident surface, wherein a convex pseudo half-spindle type reflection dot is provided in said light distribution controlling surface, said pseudo half-spindle type reflection dot comprising:

a first curved sloped surface provided on a side of said counter light incident surface; and a second curved sloped surface provided on a side of said light incident surface against said first curved sloped surface and coupled to said first curved sloped surface, said first curved sloped surface forming a first circular arc shape viewed from said light distribution controlling surface, said second curved sloped surface forming a second circular arc shape viewed from said light distribution controlling surface, said first curved sloped surface forming a third circular arc shape viewed from said counter light incident surface, said second curved sloped surface forming said third circular arc shape viewed from said light incident surface, said second curved sloped surface being smaller than said first curved sloped surface.

3. The light guide plate as set forth in claim 1, wherein a maximum camber of said first circular arc shape is larger than a maximum camber of said second circular arc shape.

4. The light guide plate as set forth in claim 1, wherein θ1>θ2 where θ1 is an angle of said first curved sloped surface against a normal of said light distribution controlling surface; and θ2 is an angle of said second curved sloped surface against the normal of said light distribution controlling surface.

5. The light guide plate as set forth in claim 4, wherein θ1 is 30° ~89°; and

θ2 is 0° ~60° to less than 90°.

6. The light guide plate as set forth in claim 1, wherein a width of said pseudo half-spindle type reflection dot is 5 μm~75 μm.

7. The light guide plate as set forth in claim 1, wherein a depth of said pseudo half-spindle type reflection dot is 1 μm~10 μm.

8. A manufacturing method of the light guide plate as set forth in claim 1, comprising:

a concave dot metal mold mechanical processing step adapted to form multiple concave dots corresponding to multiple ones of said pseudo half-spindle type reflection dots in a metal mold, to mechanically process a concave dot metal mold.

9. The manufacturing method as set forth in claim 8, wherein said concave dot metal mold mechanical processing step uses a cutting tool and a piezoelectric element unit driving said cutting tool.

10. The light guide plate as set forth in claim 2, wherein a maximum camber of said first circular arc shape is larger than a maximum camber of said second circular arc shape.

11. The light guide plate as set forth in claim 2, wherein θ1>θ2 where θ1 is an angle of said first curved sloped surface against a normal of said light distribution controlling surface; and θ2 is an angle of said second curved sloped surface against the normal of said light distribution controlling surface.

12. The light guide plate as set forth in claim 11, wherein θ1 is 30° ~89°; and

θ2 is 0° to less than 90°.

13. The light guide plate as set forth in claim 2, wherein a width of said pseudo half-spindle type reflection dot is 5 μm~75 μm.

14. The light guide plate as set forth in claim 2, wherein a height of said pseudo half-spindle type reflection dot is 1 μm~10 μm.

15. A manufacturing method of the light guide plate as set forth in claim 2, comprising:

a concave dot metal mold mechanical processing step adapted to form multiple concave dots corresponding to multiple ones of said pseudo half-spindle type reflection dots in a metal mold, to mechanically process a concave dot metal mold.

16. The manufacturing method as set forth in claim 15, wherein said concave dot metal mold mechanical processing step uses a cutting tool and a piezoelectric element unit driving said cutting tool.

* * * * *